(12) United States Patent
DeFelice et al.

(10) Patent No.: US 10,766,197 B2
(45) Date of Patent: Sep. 8, 2020

(54) APPARATUS AND METHOD FOR SELECTIVE LASER SINTERING AN OBJECT WITH A VOID

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 183 days.

(21) Appl. No.: 15/470,328

(22) Filed: Mar. 27, 2017

(65) Prior Publication Data

US 2017/0282455 A1    Oct. 5, 2017

Related U.S. Application Data

(60) Provisional application No. 62/315,752, filed on Mar. 31, 2016.

(51) Int. Cl.
| | | |
|---|---|---|
| *B29C 64/393* | (2017.01) | |
| *B33Y 30/00* | (2015.01) | |
| *B29C 64/153* | (2017.01) | |
| *B33Y 50/00* | (2015.01) | |
| *B29C 35/02* | (2006.01) | |
| *B33Y 10/00* | (2015.01) | |
| *B33Y 50/02* | (2015.01) | |

(Continued)

(52) U.S. Cl.
CPC ........ *B29C 64/393* (2017.08); *B29C 35/0288* (2013.01); *B29C 64/153* (2017.08); *B33Y 10/00* (2014.12); *B33Y 30/00* (2014.12); *B33Y 50/00* (2014.12); *B33Y 50/02* (2014.12); *B33Y 70/00* (2014.12); *B29K 2071/00* (2013.01)

(58) Field of Classification Search
CPC .. B29C 64/153; B29C 64/393; B29C 35/0288
See application file for complete search history.

(56) References Cited

U.S. PATENT DOCUMENTS 5,427,733 A * 6/1995 Benda .................... B22F 3/1055
264/40.1
5,530,221 A * 6/1996 Benda .................... B22F 3/1055
219/121.83

(Continued)

FOREIGN PATENT DOCUMENTS

DE    102013017792 A1    4/2015
JP    H09504054 A    4/1997
(Continued)

OTHER PUBLICATIONS

Extended European Search Report Application No. 17163521.2 Completed: Sep. 13, 2017; dated Sep. 25, 2017 9 Pages.

(Continued)

*Primary Examiner* — Atul P. Khare
(74) *Attorney, Agent, or Firm* — Welsh IP Law LLC (57) ABSTRACT

A method of producing an object from a polymer powder using a laser sintering system, whereby the laser sintering system introduces heat energy to solidify select points of a layer of polymer powder according to build data of the object and adjusts the heat energy according to solidification of select points of other layers.

18 Claims, 5 Drawing Sheets

(51) Int. Cl.
*B33Y 70/00* (2020.01)
*B29K 71/00* (2006.01)

(56) References Cited

U.S. PATENT DOCUMENTS

| | | | |
|---|---|---|---|
| 9,073,265 B2* | 7/2015 | Snis | B22F 3/1055 |
| 9,895,842 B2* | 2/2018 | Pfister | C08J 3/28 |
| 9,937,667 B2* | 4/2018 | DeFelice | B29C 64/386 |
| 2013/0300035 A1 | 11/2013 | Snis | |
| 2014/0252685 A1 | 9/2014 | Stucker et al. | |
| 2014/0332507 A1* | 11/2014 | Fockele | B22F 3/1055 |
| | | | 219/121.61 |
| 2015/0174658 A1 | 6/2015 | Ljungblad | |
| 2016/0271884 A1* | 9/2016 | Herzog | B22F 3/1055 |
| 2016/0332379 A1* | 11/2016 | Paternoster | B22F 3/1055 |

FOREIGN PATENT DOCUMENTS

| | | |
|---|---|---|
| JP | 2014508668 A | 4/2014 |
| JP | 2015205513 A | 11/2015 |
| WO | 2015114035 A1 | 8/2015 |

OTHER PUBLICATIONS

Japanese Office Action Application No. 2017-066885 Completed: Jul. 9, 2018; dated Jul. 12, 2018 3 Pages.
Translation of JP Office Action Application No. 2017-066885 Completed: Jul. 9, 2018; dated Jul. 12, 2018 3 Pages.
Japanese Office Action and Translation Application No. 2017-066885 Completed: Mar. 19, 2019; dated Mar. 22, 2019 5 Pages.

\* cited by examiner

APPARATUS AND METHOD FOR SELECTIVE LASER SINTERING AN OBJECT WITH A VOID

TECHNICAL FIELD

The present disclosure generally relates to additive manufacturing apparatus and methods of using the same, and more particularly relates to additive manufacturing apparatus and methods that involve selective laser sintering a polymer powder to form an object with a void.

BACKGROUND

Selective laser sintering ("LS") is a layer-wise additive manufacturing technique in which electromagnetic radiation, for example from a $CO_2$ laser, is used to bind a powder building material at select points to create a solid structure having a desired three-dimensional shape. The building material may include plastic, metal (direct metal laser sintering), ceramic, or glass powders. In some related techniques, for example techniques for use with metals, a technique referred to as selective laser melting ("LM") is used in which the powder is melted as opposed to sintered. While there are similarities between the processes, there are also distinct differences, both in the processes and powders used therein.

Typically, a CAD model of an object to be constructed by LS is prepared using known software applications. The CAD model is sectioned into layers to create build data for the object. The build data comprises a plurality of cross-section patterns according to the CAD model. For each layer the LS building process is as follows: a layer of a building material is deposed on a bed of a laser sintering system. The applied layer is scanned and solidified at select points by a source of controlled electromagnetic radiation in accordance with the cross-section pattern associated with that layer. After a cross-section is scanned causing solidification at select points, the bed is lowered by one layer thickness, a new layer of powdered material is deposed on the bed, and the bed is rescanned by the laser. This process is repeated until the build is completed. Prior to scanning, an LS machine may preheat the powder material deposed on the bed to a temperature proximate to a melting point of the powder. Preheating is typically accomplished by one or more radiant heaters. Preheating the powder makes it easier for the laser to raise the temperature of powder to a fusing point.

After the layer-wise process is completed, the formed object(s) is deposed in a volume of unfused powder, referred to as a cake. The formed object(s) is extracted from the cake and unfused powder is removed from any voids in the object. Compressed air may be used to aid in this step. The powder from the cake that is not fused into the built part can be recovered, sieved, and used in a subsequent LS build.

A known problem that arises during the layered production of objects from powdered materials is that the physical properties of the object being formed vary from step to step with each melted volume element. This can decrease the mechanical strength of the object in the z-axis. One reason for this, particularly in cases of LM of metals, is the change in the thermal conductivity caused by the increase in the solidified volume relative to the unsolidified volume during the layer-wise building process. In the case of materials having a relatively high thermal conductivity, the increase in temperature brought about by a specific application of energy per time unit to the respective irradiation point depends on the thermal conductivity of the surrounding region of the irradiation point.

In the case of metals, there is a problem that the thermal conductivity of the powdered material often differs considerably from the thermal conductivity of a formed region of the constructed objects, which material has been solidified by melting during the building process. If the respective irradiation point is surrounded exclusively by powdered material the heat formed at the irradiation point cannot dissipate very effectively and localized overheating of the powdered material may occur, resulting in reduced mechanical strength of the constructed part. On the other hand, if the irradiation point is surrounded by solidified material the heat can dissipate more rapidly because of the higher thermal conductivity of the surrounding region and the irradiation point is not so easily overheated. Based on these effects it was often the case that different regions of a constructed object were melted at considerably varying temperatures, resulting in the formation of mechanical stresses in the object.

U.S. Pat. No. 5,427,733 to Benda et al. ("Benda") discloses a method for performing temperature controlled laser sintering of metal. Benda attempts to solve the above problem associated with LM of metal by dynamically adjusting the power of the laser. Benda discloses a temperature-controlled laser sintering system that controls the power of the laser as a function of the temperature of the bed surface. The system includes a laser beam which is focused onto a sintering bed by a focusing mirror and a set of scanning mirrors. Thermal radiation emitted from the sintering bed is imaged to the scanning mirrors and to a dichroic beam splitter which reflects such radiation but passes the wavelength of the laser beam. The radiation is focused onto an optical detector which provides a signal on a line to a power control circuit. The power control circuit controls a modulator which modulates the power of the laser beam so as to maintain the thermal radiation emission (and thus the temperature at the sintering location) at a substantially constant level.

U.S. Publication No. 20140332507 to Fockele ("Fockele") is also directed to the manufacture of objects from metal using layer-wise LM construction methods. Fockele recognizes the necessity of considering temperature inhomogeneities within a layer to be solidified when energy is inputted by means of a laser. Fockele teaches accounting for different heat dissipation capabilities of the surrounding area of a point of incidence of the beam and calculating the heat dissipation capability for each voxel in this local surrounding area. In order to determine the heat dissipation capability at a point of incidence of the beam, Fockele teaches accounting for heat dissipation capability in an area preferably over at least 100 layers in a downwards direction below the current irradiation point and preferably at least as wide.

U.S. Publication No. 20160332379 to Paternoster et al. ("Paternoster") is also directed to a method of controlling energy in a layer-wise construction method. Paternoster attempts to minimize a variation in remelting temperature by considering the time dependence of the cooling-down of a solidified region. The adjustment method taught in Paternoster is premised on the observation that for longer total exposure times of the regions exposed (solidified) within a layer, these regions have more time for giving off heat by heat radiation, heat conduction or convection. Therefore, the layer cools down more and there is not so much energy available in total for a melting or sintering of the following layer. Paternoster postures that as a result, the mechanical properties such as the elongation at break, are worse due to a worse adhesion of the following layer. On the other hand, for a short total exposure time of a layer, such layer does not cool down so much and the powder in the following layer can melt more completely resulting in better mechanical properties. In order to overcome this problem, Paternoster discloses adjusting the heat inputted per unit area for a solidification in dependence of the total exposure time of the region to be solidified in the layer lying below the layer to be currently exposed or in dependence of the total exposure time of the region to be solidified in the layer currently to be exposed.

A disadvantage of the solutions proposed is that they adjust the heat inputted per unit area for a solidification in dependence of the thermal conductivity of the building material. Further, the solutions proposed above are concerned with LM of metal powder, which has a relatively high thermal conductivity in a solidified state and a relatively lower thermal conductivity in a powder form. For example, a recent study titled, Thermal Conductivity of Metal Powder and Consolidated Material Fabricated Via Selective Laser Melting, found that a stainless steel in powder form has a thermal conductivity of 0.14 W/(m*K) and the material in bulk form has a thermal conductivity of 42.70 W/(m*K).

The discussed methods are not applicable for LS of a polymer material that exhibits significantly less variation in thermal conductivity between powdered form and bulk form. For example, polyaryletherketones ("PAEK") polymers are of specific interest in the LS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketone ketone ("PEKK"), polyetherketone ("PEK"), polyetheretherketoneketone ("PEEKK") or polyetherketoneetherketoneketone ("PEKEKK"). For example, PEKK is of interest in the LS process. Available publications and test data show that the thermal conductivity of powder PEKK is 0.1 W/(m*K), while the thermal conductivity of bulk PEKK is approximately 0.2 W/(m*K).

Another disadvantage of the known methods of adjusting the laser power in layer-wise building techniques is that they are agnostic to part geometry. In the LS of a polymer, for example PEKK, the powder is deposed on the bed surface having a thickness of approximately 125 μm. Use of the normally rated laser power for a PEKK material at this thickness during LS causes penetration into sub layers of the LS bed, thereby providing additional heat energy to the layers directly below the point of incidence. The area below the point of incidence that is affected by the energy input by the laser is commonly referred to as the heat affected zone or HAZ. In the case of PEKK and other PAEK polymers, the HAZ is typically between 1 and 5 layers below the point of incidence, depending on the laser power, the material, and the thickness of the layers.

The inventors have discovered that the HAZ can have significant impact on part geometry, particularly as it relates to the construction of voids in the object for construction. For example, when constructing such voids in an object a plurality of layers having a continuous area of unsintered material are deposed on bed. The unsintered material will ultimately be removed when the build is complete, leaving a void that is defined by the surface of the surrounding material sintered during the process. Typically, the void will be defined by an upper surface.

A disadvantage of the known methods of LS is that when sintering a downskin layer the HAZ will cause layers below the downskin to become sintered and/or to adhere to the object that is being constructed, causing the geometry of the complete part to materially deviate from the geometry specified by the CAD model. This effect can be particularly disadvantageous in the manufacture of parts requiring tight tolerances. For example, Oxford Performance Materials, Inc., based in S. Windsor, Conn., uses the LS technique to manufacture customer medical implants from PEKK, including its OsteoFab® Patient Specific Cranial Device (OPSCD), OsteoFab® Patient Specific Facial Device (OPSFD), and OsteoFab® Patient Specific Facial Device (OPSFD). Oxford Performance Materials, Inc. also manufactures aerospace components and industrial components using the LS layer-wise method. In these applications, ensuring that the constructed part conforms geometrically to its CAD model is essential. After a part is constructed, its geometry can be compared to the CAD model using a number of different techniques.

Another disadvantage of the known solutions is that they do not account for reverse heating in the area of underhang, i.e., the reverse of an overhang. Reverse heating causes unwanted interlayer fusion in subsequent layers. Although less pronounced, the latent heat in a recently sintered portion of a layer will cause an immediately adjacent and unsintered portion in a subsequent layer applied above to become adhered to the underhang, resulting in an additional deviation in part geometry.

Accordingly, there is need for an improved system and method for the manufacture of an object by LS.

SUMMARY OF THE INVENTION

The present invention resides in one aspect in a method of producing an object from a polymer powder using a laser sintering system. The method includes the step of providing build data of the object. The build data comprises a plurality of cross-section patterns according to a geometry description data of the object. Each cross-section pattern comprises data specifying select points in the cross-section for solidification, each of the select points in a cross-section pattern selected for solidification having a unique position in the cross-section pattern. The method further includes the step of applying a layer $L_0$ of a polymer powder on a bed of a laser sintering system. The method further includes the step of solidifying select points of the polymer powder of layer $L_0$ by heat energy introduced by controlled electromagnetic radiation according to the cross-section pattern assigned to layer $L_0$. The method further includes the step of adjusting the heat energy introduced by electromagnetic radiation to solidify a select point at a first position in the layer $L_0$ depending on whether the build data specifies solidification of a select point at the first position in one or more of: a previous layer $L_{-n}$ and a subsequent layer $L_{+n}$.

In some embodiments of the present invention, n is a positive integer and $L_{-1}$ is a layer immediately preceding layer $L_0$, $L_{-2}$ is a layer immediately preceding $L_{-1}$, and so forth, and $L_{+1}$ is the layer immediately subsequent layer $L_0$, $L_{+2}$ is the layer immediately subsequent $L_{+1}$, and so forth.

In some embodiments of the present invention, the adjustment to the heat energy introduced by electromagnetic radiation to solidify the select point at the first position in the layer $L_0$ depends on whether the build data specifies solidification of the select point at the first position in a layer $L_{-n}$.

In yet a further embodiment of the present invention, the adjustment to the heat energy introduced by electromagnetic radiation to solidify the select point at the first position in the layer $L_0$ depends on whether the build data specifies solidification of the select point at the first position in layer $L_{-1}$.

In yet a further embodiment of the present invention, the adjustment to the heat energy introduced by electromagnetic radiation to solidify the select point at the first position in the layer $L_0$ depends on whether the build data specifies solidification of the select point at the first position in layers $L_{-1}$, $L_{-2}$, and $L_{-3}$.

In yet a further embodiment of the present invention, the adjustment to the heat energy introduced by electromagnetic radiation to solidify the select point at the first position in the layer $L_0$ depends on whether the build data specifies solidification of the select point at the first position in layers $L_{-1}$ through $L_{-5}$.

In yet a further embodiment of the present invention, the adjustment to the heat energy introduced by electromagnetic radiation to solidify the select point at the first position in the layer $L_0$ depends on whether the build data specifies solidification of the select point at the first position in one or more layer $L_{-n}$, wherein the one or more layer $L_{-n}$ is in a heat affected zone caused by an unadjusted introduction of heat energy.

In yet a further embodiment of the present invention, wherein in the step of solidifying select points the heat energy is introduced by laser radiation and the heat energy amount is adjusted at least in part by variation of one or more of a laser light intensity, a deflection velocity of the laser beam, and a variation of the distance between the laser beam tracks on the powder layer.

In yet a further embodiment of the present invention, the polymer powder has a solid-to-powder ratio of less than 50:1.

In yet a further embodiment of the present invention, the polymer powder comprises one or more of PEK, PEEK, PEKK, PEEK, PEKEKK.

In yet a further embodiment of the present invention the polymer powder comprises PEKK.

In yet another embodiment of the present invention, the adjustment of heat energy introduced by electromagnetic radiation to solidify the select point at a first position in the layer $L_0$ does not depend on whether the build data specifies solidification of select points other than the first position in one or more relied upon layer $L_{-n}$ and layer $L_{+n}$.

The present invention resides in another aspect in a system for producing an object from a polymer powder. The system comprises a housing defining a chamber. A support platform is deposed in the chamber and moveable therein along at least one axis for supporting one or more layers of a polymer powder and any part formed therein. The system further includes a spreader for applying a layer of polymer powder to a bed defined by an upper surface of the support platform or an upper surface of a layer of powder deposed thereon. The system further includes an irradiation source for irradiating select points in the powdered layer prepared most recently on the support platform. The system further includes a database storing build data for an object to be produced, the build data comprises a plurality of cross-section patterns according to a geometry description data. Each cross-section pattern comprises data specifying select points in the cross-section for solidification. Each of the select points in a cross-section pattern selected for solidification have a unique position in the cross-section pattern. The system further includes a controller for controlling the irradiation device to solidify select points of the polymer powder of a layer $L_0$ by a heat energy introduced by a controlled electromagnetic radiation via the irradiation device according to the cross-section pattern assigned to layer $L_0$ in the build data. The system further includes software executing on the controller for adjusting the heat energy introduced by electromagnetic radiation to solidify a select point at a first position in the layer $L_0$ depending on whether the build data specifies solidification of a select point at the first position in one or more of: a previous layer $L_{-n}$ and a subsequent layer $L_{+n}$.

DETAILED DESCRIPTION OF THE INVENTION

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The present invention is especially useful for LS with polymer powders. One such class of polymer powders is Polyaryletherketones ("PAEK") polymers. PAEKs are of interest in the LS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

where A is a p,p'-Ph-O-Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in, for example, Cheng, Z. D. et al, "Polymorphism and crystal structure identification in poly(aryl ether ketone ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercoolings, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Conn., including OXPEKK®-C, OXPEKK®-CE, OXPEKK®-D and OXPEKK®-SP, OXPEKK®-N, OXPEKK®-ESD polymers. Polyetherketoneketone polymers are also manufactured and supplied by Arkema. In addition to using polymers with a specific T:I ratio, mixtures of polyetherketoneketones may be employed.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated to not significantly reduce the melting temperature or the quantity of the crystallinity formed in the heat treatment process.

Although the present disclosure is provided in reference to PAEK polymers, and more specifically PEKK polymers, the present disclosure is not so limited. A person of ordinary skill in the art and familiar with this disclosure would understand that the present invention may be employed with other types of polymers useful in LS and with other materials useful in LS, including, but not limited to, metals and ceramics.

Figure 1:
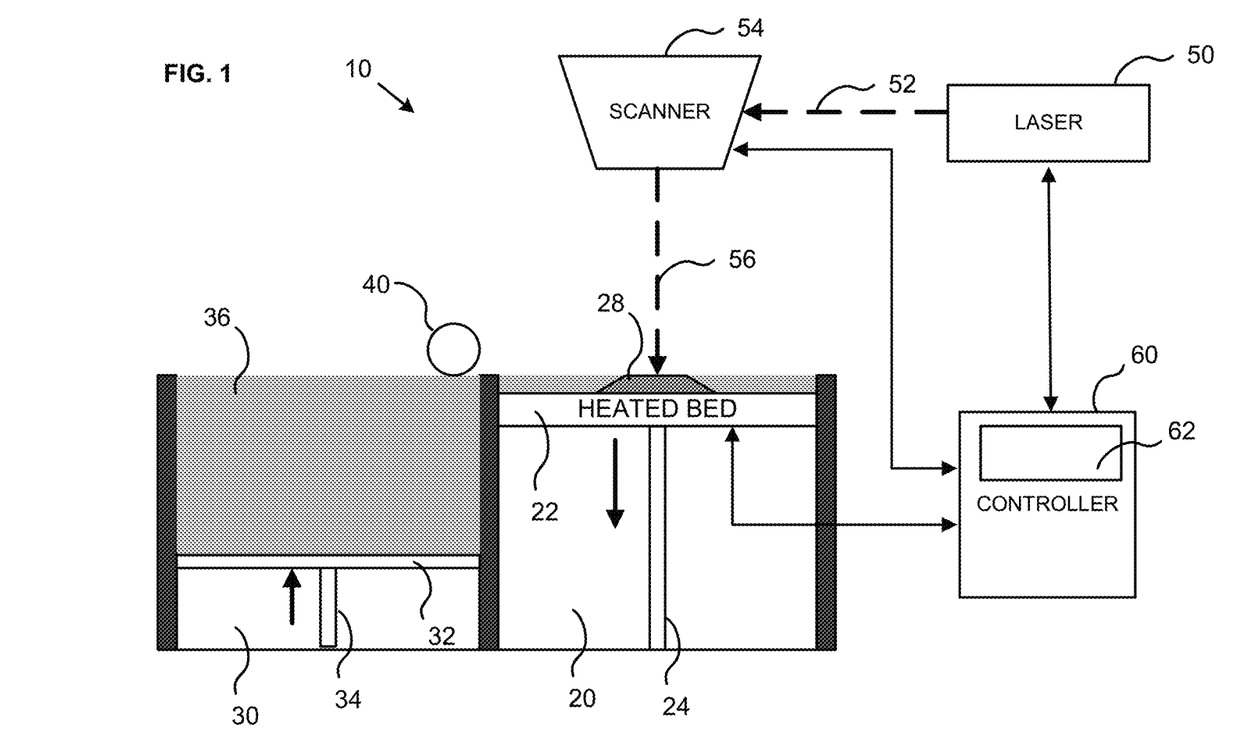
FIG. 1 illustrates an LS machine in accordance with one embodiment of the present invention.

In reference to FIG. 1, an LS system 10 in accordance with the present invention is illustrated. The system 10 includes a first chamber 20 having an actuatable piston 24 deposed therein. A bed 22 is deposed at an end of the piston 24. It should be understood that the term bed may refer to the physical structure supported on the piston or the uppermost layer of powder deposed thereon.

The temperature of the bed 22 can be variably controlled via a controller 60 in communication with heating elements (not shown) in and or around the bed 22. Furthermore, the LS system 10 according to the invention may include a heating device above the bed 22, which preheats a newly applied powder layer up to a working temperature below a temperature at which the solidification of the powder material occurs. The heating device may be a radiative heating device (e.g., one or more radiant heaters) which can introduce heat energy into the newly applied powder layer in a large area by emitting electromagnetic radiation.

A second chamber 30 is adjacent to the first chamber 20. The second chamber 30 includes a table surface 32 deposed on an end of a piston 34 deposed therein. A powder 36 for use in the LS system 10 is stored in the second chamber 30 prior to the sintering step. It will be understood to a person of ordinary skill in the art and familiar with this disclosure that while a specific embodiment of an LS system is disclosed, the present invention is not limited and different known LS systems may be employed in the practice of the present invention.

During operation of the LS system 10, a spreader 40 translates across a top surface of the first chamber 20, evenly distributing a layer of powder 36 across either the top surface of the bed 22, or the material previously deposed on the bed 22. The LS system 10 preheats the powder material 36 deposed on the bed 22 to a temperature proximate to a melting point of the powder. Typically, a layer of powder is spread to have a thickness of 125 μm, however the thickness of the layer of powder can be increased or decreased depending on the specific LS process and within the limits of the LS system.

A laser 50 and a scanning device 54 are deposed above the bed 22. The laser 50 transmits a beam 52 to the scanner 54, which then distributes a laser beam 56 across the layer of powder 36 deposed on the bed 22 in accordance with a build data. The laser selectively fuses powdered material by scanning cross-sections generated from a three-dimensional digital description of the part on the surface of the bed having a layer of the powdered material deposed thereon. The laser 50 and the scanner 54 are in communication with the controller 60. After a cross-section is scanned, the bed 22 is lowered by one layer thickness (illustrated by the downward arrow), a new layer of powdered material is deposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

Figure 2A:
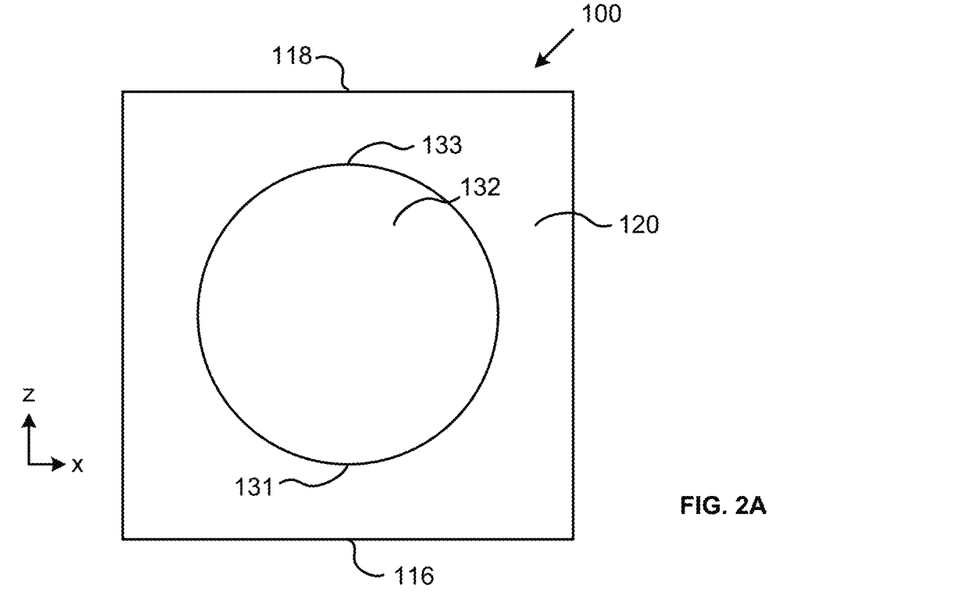
FIG. 2A shows a front view of an object.
Figure 2B:
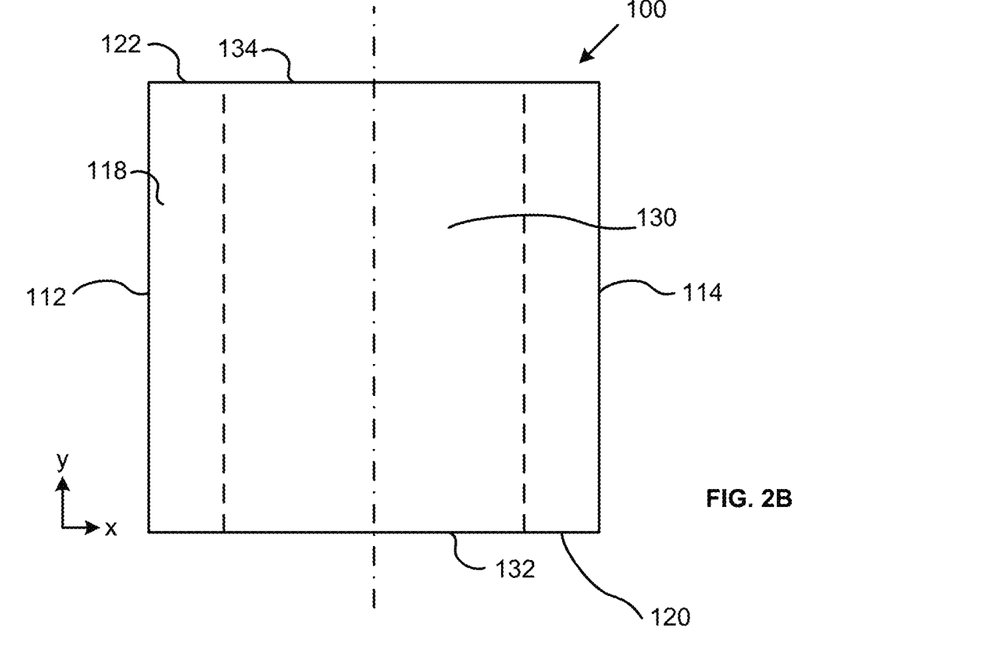
FIG. 2B shows a top view of the object in FIG. 2A.

In reference to FIGS. 2A-2B, an object 100 having a void to be constructed in accordance with the inventive method is shown. FIG. 2A shows a front view of the object 100 and FIG. 2B shows a top view of the object 100. The object 100 is a block. It will be understood that it is possible to manufacture an essentially unlimited number of geometries using the LS layer-wise construction method.

The block 100 shown in FIGS. 2A-2B is approximately a right prism rectangle. The block 100 has a front surface 120, a top surface 118, a bottom surface 116, a first side surface 112 and a second side surface 114, and a rear surface 122. The block 100 defines a bore 130 that extends through the block along an axis between a first opening 132 in the front surface 120 and a second opening 134 in the rear surface 122. The bore 132 is generally cylindrical. The cross-section of the bore 130 is circular in a cross-section plane being perpendicular to the bore axis. An upper portion 133 of the wall of the bore 130 defines an overhang. The overhang may also be referred to as a downskin. The upper portion 133 is referred to as an overhang because it is above the void in the block 100 as the block 100 is oriented in the construction process. This upper portion 133 may also be referred to as a downskin because during the LS layer-wise construction process the upper portion 133 is sintered in successive layers that are adjacent to previously deposited layers of unsintered powder. Likewise, a lower portion 131 of the wall of the bore 130 defines an underhang. The underhang may also be referred to as an upskin. The lower portion 131 is referred to as an underhang because it is below the void in the block 100 as the block 100 is oriented in the construction process. This lower portion 131 may also be referred to as an upskin because during the LS layer-wise construction process the lower portion 131 is sintered in successive layers that are adjacent to subsequently deposed layers of unsintered powder.

Figure 4A:
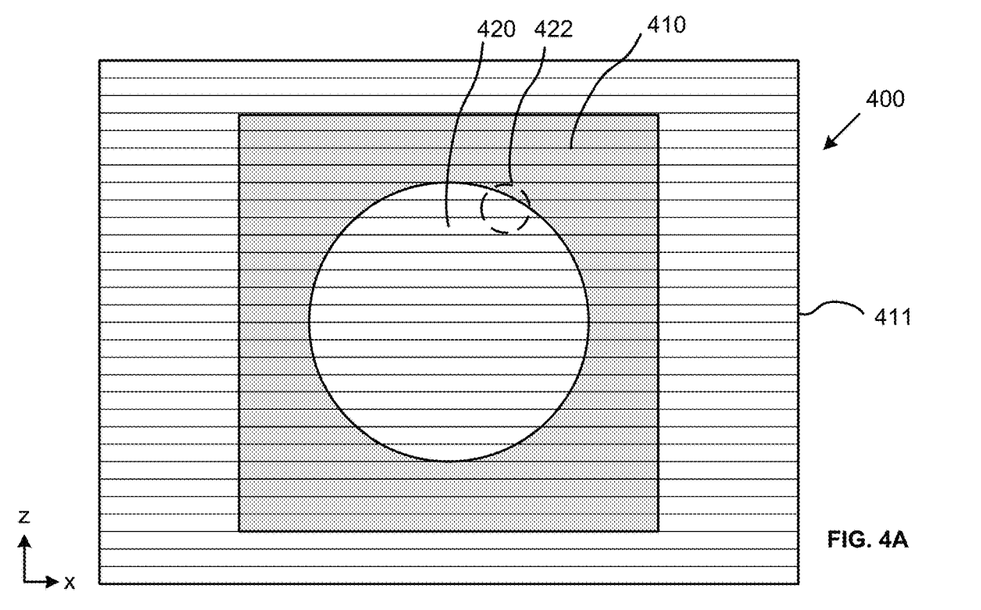
FIG. 4A illustrates a plurality of cross-sections corresponding to layers for the manufacture of an object by the LS method.
Figure 4B:
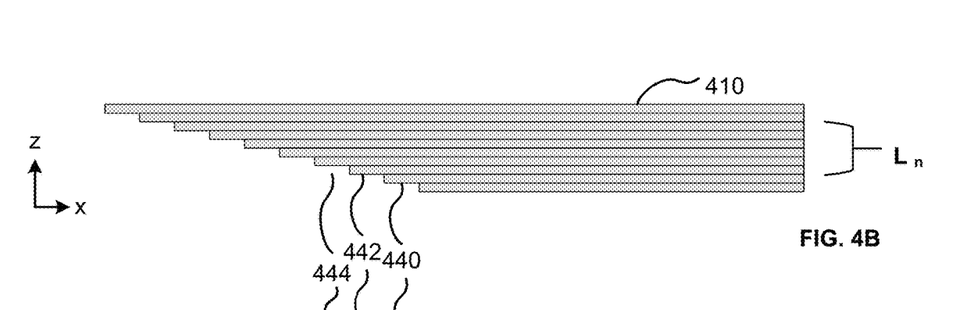
FIG. 4B shows a front view of a portion of the object shown in 4A.
Figure 4C:
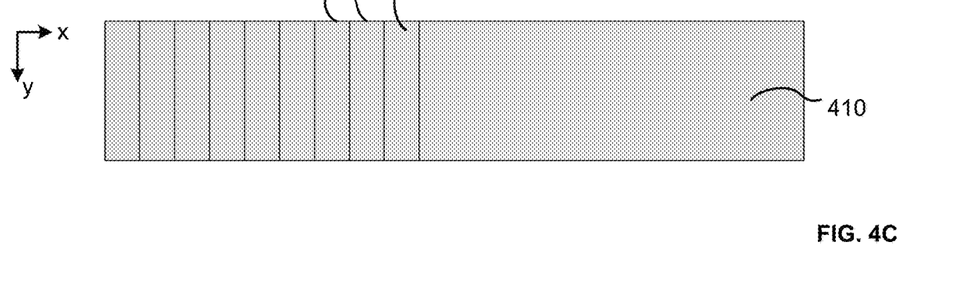
FIG. 4C shows a top view of a portion of the object shown in 4B.

In reference to FIGS. 4A-4C, build data 400 for construction of the block 100 shown in FIGS. 2A-2B is represented. In practice, a part (e.g., block 100) is prepared using a CAD software program. In preparing for the build, the CAD model is sectioned into layers, wherein each layer corresponds to a layer in the LS build process. In reference to FIGS. 4A-4C, a perimeter 411 of the build data 400 is shown. The perimeter 411 is commensurate in scope with the inside dimensions of the build chamber. The present invention, for example, may be practiced using the EOSINT P 800 Additive Manufacture System. The P800 has a build volume that measures 700 mm×380 mm×560 mm (27.6 in×15 in×22.05 in). Although a single object, the block 100, is shown in the build data 400 it is common for a LS build to include multiple objects.

The CAD model is sectioned into a plurality of successive layers corresponding to layers of the build. Each layer has a cross-section pattern of the object for construction. The cross-section pattern comprises data specifying select points in the cross-section for solidification. Each point selected for solidification in a layer has a unique x-coordinate and y-coordinate in the cross-section. A software program, for example one executing on the LS machine controller or on a computer in communication therewith, determines an amount of heat energy to introduce to each point selected for solidification. The amount of heat energy can be a number of different controls. For example, in the P800 it is possible to adjust the power of the laser, the width of the laser, the tracking speed of the laser, laser deflection velocity, the hatch pattern of the laser, and/or the contour pattern of the laser. It is possible to base the amount of heat energy introduced at select points on different inputs, including those related to the type of material and desired properties.

In reference to FIG. 4A, the area of the build data 400 for sintering in each layer is shown in gray 410, while the area not designate for sintered, i.e. will remain unsintered, is shown in white 420. The bore 130 that extends through the block 100 is shown in white because it is not sintered during the build process. For example, during a cross-section that includes the bore, heat energy is not introduced at select points corresponding to the bore in the cross-section.

In reference to FIGS. 4B-4C, a close-up the portion of the build data 400 shown in FIG. 4A and identified by an enlargement circle 422 is shown. FIG. 4B shows a front view of the layers included in the enlargement circle 422, while FIG. 4C shows a bottom view of the layers included in the enlargement circle 422. It will be understood to a person of ordinary skill the art and familiar with this disclosure, that the cross-sections in FIG. 4A are scaled larger in the Z direction for the purpose of illustrating the present invention. In practice, the layer is typically 125 μm in thickness.

In reference to FIG. 4B, the individual layers that comprise a portion of the block are shown 410. Each individual layer in the build data can be referred to as $L_n$, where n is an integer. In the present disclosure, $L_0$ may refer to a specific layer in the build data 400. $L_{-1}$ is the layer immediately below the layer $L_0$. During the build process, $L_{-1}$ is deposed on the bed and then sintered according the build data. Then $L_0$ is deposed on the bed and sintered. $L_{-2}$ is the layer below $L_{-1}$ and so forth. Likewise, $L_{+1}$ is the layer that is prepared after $L_0$, and $L_{+2}$ is the layer that is prepared after $L_{+1}$, and so forth.

In further reference to FIG. 4B a plurality of layers are shown L. The opening of the bore 130 is also shown. Specifically, the downskin portion of the bore is shown. Although the CAD model indicates that the bore 130 has a circular cross-section, it is manufactured as a plurality of steps sintered into successive layers. A portion of layer defining the wall of the bore comprises a downskin sinter. Downskins, for example, are illustrated by reference numbers 444, 442, 440.

As discussed in the background section of the pending disclosure, the inventors have discovered that heat energy introduced to sinter a select point in $L_0$ will penetrate several layers below $L_0$. This is referred to as the heat affected zone (HAZ). A problem arises when a downskin portion is sintered because unsintered power in the layers below will adhere to the downskin layer, thus causing a deviation in the geometry of the formed object relative to the geometry of the CAD model.

Figure 3A:
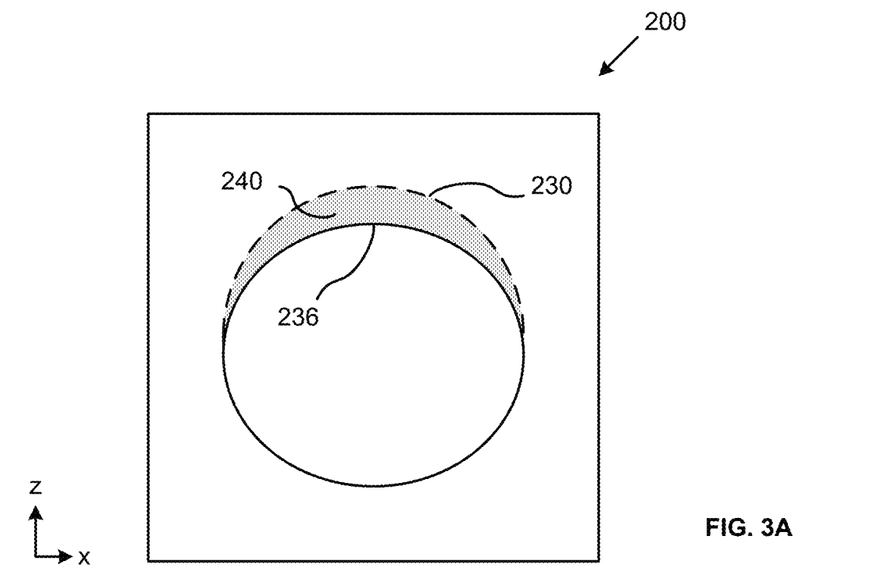
FIG. 3A illustrates an over sinter problem associated with known system and methods.

FIG. 3A illustrates the problem caused by HAZ as it relates to the manufacture of an object with a void. A block 200 includes a bore 236 that extends therethrough and has a constant circular cross-section in a plane perpendicular to the bore axis. The dashed line 230 illustrates the circular cross-section specified by the CAD model. Known LS building methods do not account for the downskin sinters. As a result, the heat energy introduced to the select points in the downskin causes an oversinter and binds several layers of below. This results in the overhang portion of the bore having a flat surface as opposed to the specified circular cross-section. The geometric difference is illustrated by the gray area 240 in FIG. 3A.

Figure 3B:
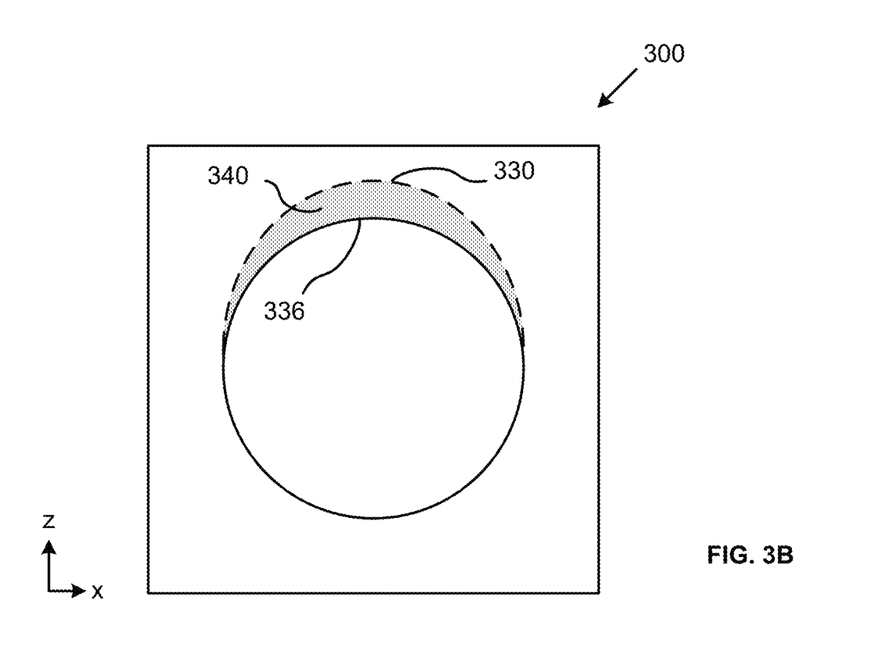
FIG. 3B illustrates a method used in the prior art to address over sinter.

The current common practice to correct this problem is to modify the CAD design so that the bore has a cross-section that is more oval or egg shaped. The goal of this approach is to arrive at a bore having a circular cross-section relying on the oversinter to fill in the modified geometry that adds to the upper part of the void. This method is illustrated in FIG. 3B with a block 300 having a bore 336 defining an oval cross-section 330. The over sinter of material at the downskin results in a block having a bore with a circular cross-section. A disadvantage of this method is that it is very difficult to determine the correct geometry modifications to achieve the desired result. Furthermore, if a preferred geometry modification is known, it is very difficult to scale the modification to different sized voids having the same geometry. Finally, it is very difficult to practice this correction method when preparing voids having complex geometric patterns.

The inventors have discovered a method of adjusting the heat energy introduced to a select point of a layer to reduce the problems with oversinter, and more specifically the problem of fusing a select point for solidification to select points in previously deposed layers that were not solidified during the LS process.

An adjustment factor according to the present invention may be succinctly described by means of the following equation, in which $E_{adjusted}$ is the heat energy amount per unit area actually introduced at a position, $E_{standard}$ is the heat energy amount per unit area without consideration of the build data and previous or subsequent layers and K is a pre-factor that depends on the total exposure time of a region to be solidified in the previous and/or the current layer:

$$E_{adjusted} = K \cdot E_{standard} \quad (1)$$

The pre-factor can be determined and applied according to the following method. The determination of the pre-factor can for example be made empirically by pre-tests in the same additive manufacturing device in which the three-dimensional objects shall be manufactured. In doing so, before the actual manufacturing of the object, test objects are manufactured from the same building material and are measured.

The method includes the step of providing build data of an object for construction in an LS system. The build data is derived from a CAD model of the object and includes a plurality of cross-section patterns according to a geometry description of the object. This may be, for example, a CAD file. Each cross-section pattern corresponds to a layer in the layer-wise building process. Thus, each cross-section may have a thickness in the z-axis that corresponds to the thickness of the applied layers in the LS system. The cross-section pattern comprises data specifying select points in the cross-section for solidification. Each of the select points in the cross-section pattern selected for solidification has a unique position in the cross-section pattern. The select points can, for example, be represented by Cartesian coordinates in an (x,y) plane.

The LS machine applies a layer $L_0$ of a polymer powder on a bed of a laser sintering system. The thickness of $L_0$ can correspond to a thickness of a cross-section in the build data. The LS machine then solidifies select points of the polymer powder of layer $L_0$ by introducing heat energy to the select points by controlled electromagnetic radiation according to the cross-section pattern assigned to $L_0$. The amount of heat energy is initially set according to previously known methods that fail to account for the geometry of the manufactured part, and more specifically fail to account for unsintered material layers (e.g., voids) proximate to the selected point. To account for these voids, the method adjusts the heat energy introduced by electromagnetic radiation to solidify a select point at a first position in the layer $L_0$ depending on whether the build data specifies solidification of a select point at the first position in one or more of: a previous layer $L_{-n}$ and a subsequent layer $L_{+n}$.

In the above described method, n is a positive integer and $L_{-1}$ is a layer immediately preceding layer $L_0$, $L_{-2}$ is a layer immediately preceding $L_{-1}$, and so forth, and $L_{+1}$ is the layer immediately subsequent layer $L_0$, $L_{+2}$ is the layer immediately subsequent $L_{+1}$, and so forth. To correct for oversinter on downskin builds, the method adjusts the heat energy introduced by electromagnetic radiation to solidify the select point at the first position in the layer $L_0$ depending on whether the build data specifies solidification of a select point at the first position in a layer $L_{-n}$. That is, the method looks to the layers previously deposed that are below the current layer $L_0$. In some embodiments of the present invention, the method will adjust the heat energy introduced based on whether the build data specifies solidification of a select point at the first position in layer $L_{-1}$. In other embodiments of the present invention, the method will adjust the heat energy introduced based on whether the build data specifies solidification of a select point at the first position in layers $L_{-1}$, $L_{-2}$, and $L_{-3}$. In yet other embodiments of the present invention, the method will adjust the heat energy introduced based on whether the build data specifies solidification of a select point at the first position in layers $L_{-1}$ through $L_{-5}$. It is preferred that the method looks the build data in one or more layers $L_{-n}$ in a HAZ caused by an unadjusted introduction of heat energy, i.e., the amount of heat energy originally specified according to known methods. The inventors have discovered that, for a PEKK polymer, this is typically the first three layers below the layer of construction. A person of ordinary skill in the art and familiar with this disclosure will understand the HAZ, as determined in the Z− direction, will vary based on the material and the heat energy introduced into the material.

Figure 5:
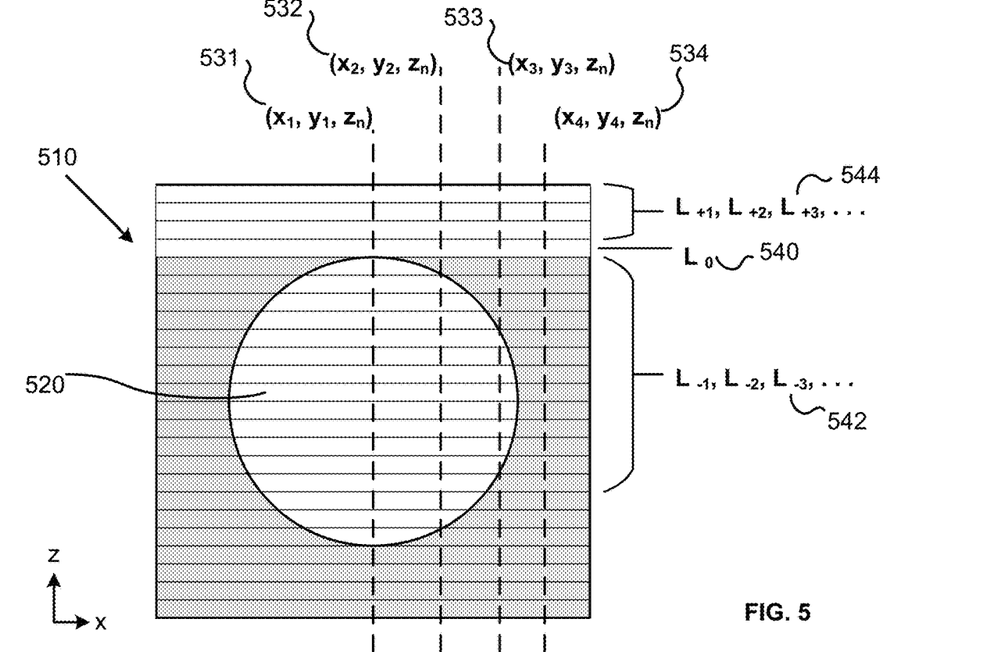
FIG. 5 illustrates a view of build data used in accordance with the present invention.

FIG. 5 illustrates the construction of a downskin layer $L_0$ 540. A block 510 having a bore 520 with a circular cross-section extending therethrough is being constructed in accordance with the LS method of the present disclosure. In the construction, several layers have been constructed by the LS method $L_{-1}$, $L_{-2}$, $L_{-3}$ ... 542. The previously constructed layers 542 are illustrated in gray. The method is currently preparing to sinter layer $L_0$ 540, which has been applied to the bed. The build data includes information for subsequent layers $L_{+1}$, $L_{+2}$, $L_{+3}$ ... 544.

FIG. 5 illustrates several select points for solidification in $L_0$ to illustrate the present invention. The select point for solidification is $x_1$, $y_1$, $z_n$ 531, where $z_n$ is $L_0$. Prior to building, the system specifies an amount of heat energy to be introduced to the select point for solidification at the first position. In the example shown, the amount of heat is adjusted based on whether select points at the first position in previous layers were solidified during the build process. It should be noted that this determination can be made prior to the build during an analysis of the CAD model to create the build data. In the case of select point 531 the method looks to the build data of the prior layers $L_{-1}$, $L_{-2}$, $L_{-3}$ ... 542. More specifically, the method looks to build data at the first position in the prior layers 542. That is, layers at the same position in the ($x_n$, $y_n$) plane as select point in the layer $L_0$. For example, the adjustment is made based on whether the build data specifies solidification in the three preceding layers $L_{-1}$, $L_{-2}$, $L_{-3}$. In the example shown, the build data for the select point in the first position in the preceding layer $x_1$, $y_1$, $L_{-1}$ does not specify solidification. Likewise, for the first position in $x_1$, $y_1$, $L_{-2}$, and $x_1$, $y_1$, $L_{-3}$. Accordingly, the heat energy introduced a $x_1$, $y_1$, $L_0$ is reduced to inhibit oversinter and unwanted fusion in the layers below $x_1$, $y_1$, $L_0$, thereby constructing a more geometrically accurate part.

In further reference to FIG. 5, several more examples are illustrated. In reference to select points along the axis ($x_2$, $y_2$, $z_n$) 532, the method of the present invention adjusts the heat introduced to select point $x_2$, $y_2$, $L_0$ based on whether the build data for select points in the first position in the preceding layers specify solidification. The first position at $x_2$, $y_2$, $L_{-1}$ specifies solidification. However, the first position at $x_2$, $y_2$, $L_{-2}$, and $x_2$, $y_2$, $L_{-3}$ does not specify solidification. Accordingly, the heat energy introduced a $x_2$, $y_2$, $L_0$ is reduced to inhibit oversinter and unwanted fusion in the layers below $x_2$, $y_2$, $L_0$, thereby constructing a more geometrically accurate part. This is because the HAZ can extend several layers below the layer of incidence. In some embodiments of the present invention, the heat energy is reduced, however, such reduction is less than the reduction applied to a select point having an unsintered layer at a first position in an immediately preceding layer, and specifying unsintered positions below.

In reference to a select point at $x_3$, $y_3$, $L_0$ 533 the build data at the first position in the three preceding layers specifies solidification. Therefore, there is no need to adjust the heat energy introduced at $x_3$, $y_3$, $L_0$ 533. If, however, the HAZ extends more than three layers, the method may reduce the heat energy introduced at the select point because build data specifies no solidification at the first position at $x_3$, $y_3$, $L_{-4}$. In reference to a select point at $x_4$, $y_4$, $L_0$ 534, the build data at the first position in all preceding layers specifies solidification. Therefore, there is no adjustment to the heat energy introduced at $x_4$, $y_3$, $L_0$ 534.

In the present method, the adjustment to the heat energy introduced to the select point at the first position is made based on whether the build data at the first position in preceding layers because this is the area of the heat affected zone. This method has the advantage over the prior art that relies on thermal conductivity in large three dimensional volumes near the select point for solidification because it can more accurately account for the geometry of the object and void therein being constructed. In some embodiments of the present invention, the adjustment of heat energy introduced by electromagnetic radiation to solidify a select point at a first position in the layer $L_0$ does not account for whether the build data specifies solidification of points other than the first position in one or more relied upon layer $L_{-n}$ and layer $L_{+n}$.

As discussed above, the disclosed method is also used to inhibit fusion of subsequent layers in the solidification of upskin sinters in the LS process. Polymers in general have a relatively low thermal conductivity as compared to metals commonly used in LS or LM techniques. Such low thermal conductivity of polymer powders relative to metals is derived in part from the solid-to-powder ratio in the materials. Metals used in LS or LM techniques typically possess a solid-to-powder ratio of 100:1. By comparison, the polymer powders described herein may possess a solid-to-powder ratio of less than 50:1. Higher solid-to-powder ratios typically correspond with greater thermal conductivity, especially in metals, which may have much greater thermal conductivity in solid form relative to powder form.

Accordingly, the polymer powders described herein have relatively low thermal conductivity. For example, the polymer powders may have a thermal conductivity of less than 1.0 W/K*M. In addition, there is little to no material change in the thermal conductivity between sintered polymer and powder polymer. As a result, the solidified portions of a cross-section can retain heat for a period such that when a subsequent layer is deposed on the bed having unsintered portions, the retained heat in the sintered portions may cause a fusion to the newly deposed layer. Although the oversinter problems associated with downskin sinters and the problems caused in upskin sinters with unwanted fusion in subsequent unsintered layers caused by latent heat are different, the disclosed method can be used to reduce the latter issue as well.

Figure 6:
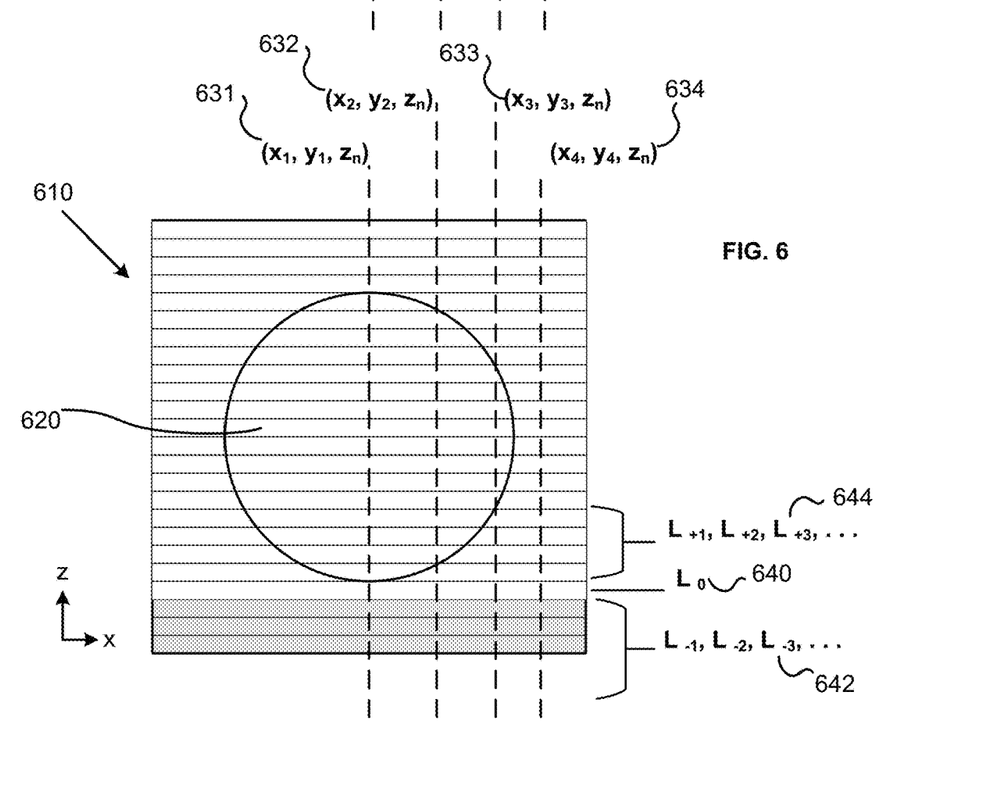
FIG. 6 illustrates a view of build data used in accordance with the present invention.

FIG. 6 illustrates the construction of a upskin layer $L_0$ 640. A block 610 having a bore 620 with a circular cross-section extending therethrough is being constructed in accordance with the LS method of the present disclosure. In the construction, several layers have been constructed by the LS method $L_{-1}$, $L_{-2}$, $L_{-3}$ ... 642. The previously constructed layers 642 are illustrated in gray. The method is currently preparing to sinter layer $L_0$ 640 which has been applied to the bed. The build data includes information for subsequent layers $L_{+1}$, $L_{+2}$, $L_{+3}$ ... 644.

FIG. 6 illustrates several select points for solidification in $L_0$ to illustrate the present invention as it pertains to minimizing unwanted interlayer fusion in upskin sinters. The select point for solidification is $x_1$, $y_1$, $z_n$ 631, where $z_n$ is $L_0$. Prior to building, the system specifies an amount of heat energy to be introduced to the select point for solidification at the first position. In the example shown, the amount of heat energy is adjusted based on whether select points at the first position in subsequent layers are to be solidified during the build process. It should be noted that this determination can be made prior to build during an analysis of the CAD model to create the build data. In the case of select point 631 the method looks to the build data of the prior layers $L_{+1}$, $L_{+2}$, $L_{+3}$ ... 644. More specifically, the method looks to build data at the first position in the subsequent layers 644. For example, the adjustment is made based on whether the build data specifies solidification in the first position in the three subsequent layers $L_{+1}$, $L_{+2}$, $L_{+3}$ 644. In the example shown, the build data for the select point in the first position in the subsequent layer $x_1$, $y_1$, $L_{+1}$ does not specify solidification. Likewise, for the first position in $x_1$, $y_1$, $L_{+2}$, and $x_1$, $y_1$, $L_{+3}$. Accordingly, the heat energy introduced at $x_1$, $y_1$, $L_0$ is reduced to reduce unwanted fusion in one or more layers subsequent to $x_1$, $y_1$, $L_0$, thereby constructing a more geometrically accurate part.

In further reference to FIG. 6, several more examples are illustrated. In reference to select points along the axis ($x_2$, $y_2$, $z_n$) 632, the method of the present invention adjusts the heat introduced to select point $x_2$, $y_2$, $L_0$ based on whether the build data for select points in the first position in the subsequent layers specify solidification. $x_2$, $y_2$, $L_{+1}$ specifies solidification. However, the first position at $x_2$, $y_2$, $L_{+2}$, and $x_2$, $y_2$, $L_{+3}$ does not specify solidification. Accordingly, the heat energy introduced a $x_2$, $y_2$, $L_0$ is reduced to inhibit unwanted fusion in the layers above $x_2$, $y_2$, $L_0$, thereby constructing a more geometrically accurate part. In reference to a select point at $x_3$, $y_3$, $L_0$ 633, the build data at the first position in the three subsequent layers specifies solidification. Therefore, there is no need to adjust the heat energy introduced at $x_3$, $y_3$, $L_0$ 633. In reference to a select point at $x_4$, $y_4$, $L_0$ 634 the build data at the first position in all subsequent layers specifies solidification. Therefore, there is no adjustment to the heat energy introduced at $x_4$, $y_4$, $L_0$ 634.

What is claimed is:

1. A selective laser sintering method, the method comprising the steps of:
   (i) providing build data of an object, the build data comprising a plurality of cross-section patterns according to geometric description data for the object, each of the cross-section patterns comprising data specifying points in the cross-section intended for solidification, and the plurality of cross-section patterns including a cross-section pattern for a layer $L_0$, a cross-section pattern for a layer $L_{-1}$, and a cross-section pattern for a layer $L_{-2}$ wherein the layer $L_{-1}$ is a layer below the layer $L_0$, and the layer $L_{-2}$ is a layer below the layer $L_{-1}$;

(ii) applying a polymer powder layer $L_0$ coinciding with the build layer $L_0$ on a bed of a laser sintering system;

(iii) determining an amount of heat energy to introduce by electromagnetic radiation to solidify a point at a first x-y position in the powder layer $L_0$, the point at the first x-y position being intended for solidification according to the cross-section pattern for the build layer $L_0$;

(iv) adjusting the amount of heat energy to introduce at the first x-y position in the powder layer $L_0$ using a controller programmed to make the adjustment based on whether the build data specifies solidification of a point at the first x-y position in the cross-section pattern for the layer $L_{-1}$ and the cross section pattern for the layer $L_{-2}$, wherein the adjustment is made to inhibit unwanted fusion between the first x-y position in the powder layer $L_0$ and the first x-y position in the layer $L_{-1}$; and (v) solidifying the point at the first x-y position in the polymer powder layer $L_0$ by introducing the adjusted amount of heat energy.

2. The method of claim 1, wherein the layer $L_{-1}$ is adjacent to the layer $L_0$.

3. The method of claim 2, wherein the layer $L_{-2}$ is adjacent to the layer $L_{-1}$.

4. The method of claim 2, wherein the adjusting step further comprises reducing the amount of heat energy to introduce by the electromagnetic radiation to solidify the point at the first x-y position in the powder layer $L_0$ when the build data does not specify solidification of the point at the first x-y position in the layer $L_{-1}$.

5. The method of claim 1, wherein the layer $L_{-2}$ is below and adjacent to the layer $L_{-1}$.

6. The method of claim 1, wherein the step of adjusting the amount of heat energy to introduce by electromagnetic radiation to solidify a point at the first x-y position in the powder layer $L_0$ also depends on whether the build data specifies solidification of a point at the first x-y position in one or more powder layers in a heat affected zone that would be impacted by the introduced radiation.

7. The method of claim 6, wherein the polymer powder comprises one or more of PEK, PEEK, PEKK, PEEKK, and PEKEKK.

8. The method of claim 7, wherein the polymer powder comprises PEKK.

9. The method if claim 1, wherein said adjusting is performed such that the amount of heat energy is adjusted so as to inhibit said fusion between the point at the first x-y position in the layer $L_0$ and the point at the first x-y position in the layer $L_{-1}$ when the build data does not specify solidification of the point at the first x-y position in the layer $L_{-1}$.

10. The method of claim 1, wherein step (iv) is performed prior to step (ii).

11. A method of solidifying an x-y position in a coating of a polymer powder during a selective laser sintering build process, the method including the steps of:

(i) providing build data for a plurality of layers in a selective laser sintering build, the plurality of layers comprising a current layer, a first layer below the current layer, a second layer below the first layer, and a third layer below the second layer, and the build data specifying a plurality of points for solidification in each of the layers, the plurality of points specified for solidification in the current layer including a point at an x-y position in the current layer;

(ii) applying a coating of a polymer powder coinciding with the current build layer on a bed of the laser sintering system;

(iii) determining an amount of heat energy to introduce by an electromagnetic radiation source to solidify the point at the x-y position in the current powder layer;

(iv) adjusting the amount of heat energy to introduce by the electromagnetic radiation source to solidify the point at the x-y position in the current powder layer using a controller programmed to make the adjustment based on whether the build data specifies solidification of a point at the x-y position in two or more of: the build data for the first layer, the second layer, and the third layer, wherein the adjustment is made to inhibit unwanted fusion between the current layer and the first layer; and (v) introducing the adjusted amount of heat energy for solidification at the x-y position in the current coating of powder.

12. The method of claim 11, wherein the first layer is adjacent to the current layer, the second layer is adjacent to the first layer, and the third layer is adjacent to the second layer.

13. The method of claim 12, wherein among the two or more layers considered for the step of adjusting the point at the x-y position in at least the first layer is considered.

14. The method of claim 13, wherein the point at the x-y position in at least the second layer is also considered among the two or more layers considered for the step of adjusting.

15. The method of claim 14, wherein the point at the x-y position in the third layer is also considered for the step of adjusting.

16. The method of claim 13, wherein said adjusting is performed such that the amount of heat energy for solidification of the point at the x-y position in the current layer is greater when the build data specifies solidification of the point at the x-y position in the first layer than when the build data does not specify solidification of the point at the x-y position in the first layer.

17. The method if claim 11, wherein the amount of heat energy is adjusted so as to inhibit said fusion between the point at the x-y position in the current layer and the point at the x-y position in the first layer when the build data does not specify solidification of the point at the x-y position in the first layer.

18. The method of claim 11, wherein step (iv) is performed prior to step (ii).

* * * * *